United States Patent Office 3,231,579
Patented Jan. 25, 1966

3,231,579
2-[6-(2-PROPYNYLOXY)-m-TOLYL]-2H-BENZOTRIAZOLE
Chester E. Pawloski, Bay City, Mich., assignor to The Dow Chemical Company, Midland, Mich., a corporation of Delaware
No Drawing. Filed Dec. 26, 1963, Ser. No. 333,641
1 Claim. (Cl. 260—308)

The present invention is directed to a compound corresponding to the formula

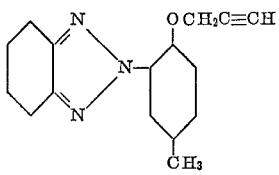

This compound is an organic liquid which is somewhat soluble in many organic solvents and of low solubility in water. The compound has been found to be useful as a pesticide for the control of various insect, fish worm, bacterial, and fungal organisms such as roundworms, beetles, roaches, blight and minnows.

The new compound can be prepared by reacting 2-(2'-hydroxy-5'-methylphenyl)benzotriazole with a propargyl halide such as propargyl bromide or propargyl chloride. The reaction is carried out in the presence of a basic material and preferably in a liquid reaction media such as isopropanol, acetone, or methyl ethyl ketone. The reaction takes place smoothly at temperatures at which the halide of reaction is produced and preferably at temperatures of from about 0 to 100° C. The halide of reaction appears in the reaction mixture as a salt of the metal constituent from the employed base. The amounts of the reactants to be employed are not critical, some of the desired product being obtained when employing the reactants in any amount. However, the reaction consumes the reactants in equimolar proportions and the use of benzotriazole, propargyl halide and the basic material in amounts which represent such proportions is preferred. Upon completion of the reaction the desired product can be separated and purified by conventional procedures.

In carrying out the reaction, the propargyl halide, benzotriazole and basic material such as an alkali metal carbonate can be combined in any convenient fashion. In a preferred procedure, the reactants are dispersed in a reaction medium with stirring and the reaction mixture maintained at the contacting temperatures for a period of time to insure completion of the reaction. A substantial cessation in the formation of the halide of reaction indicates that the reaction is nearing completion. The reaction mixture can be filtered to remove the halide of reaction and the filtrate used in pesticidal compositions or the filtrate may be further purified by conventional procedures. In a preferred procedure, the hot reaction mixture is combined with aqueous alkali metal hydroxide and heated for a short period. The alkali metal hydroxide converts any unreacted starting materials to water soluble salts which can then be removed by washing the reaction mixture with water. The organic layer obtained during the washing procedure can be employed in pesticidal applications or further purified by heating to remove the low boiling constituents.

In a representative operation, 2-(2'-hydroxy-5'-methylphenyl)benzotriazole (20 grams), propargyl bromide (15 grams) and potassium carbonate (20 grams) were dispersed in 200 milliliters of acetone, and the resulting mixture heated at the boiling temperature and under reflux for thirty hours. The reaction mixture was then combined with a solution of 25 grams of sodium hydroxide dissolved in 25 milliliters of water. After the addition of the aqueous sodium hydroxide, the reaction mixture separated into an organic and an aqueous layer. The organic layer was separated by decantation and heated to remove the low boiling constituent and obtain the 2-[6-(2-propynyloxy)-m-tolyl] - 2H - benzotriazole product as a liquid residue. This product had a refractive index $n/D$ of 1.6237 at 25° C.

The novel product of the present invention is useful as a pesticide for the control of the growth and killing of many plant and animal species. For such uses, the product is dispersed on an inert finely divided solid and employed as a dust. Such mixtures also may be dispersed in water with or without the aid of a surface active agent, and the resulting aqueous suspensions employed as sprays. In other procedures, the product is employed as an active constituent in solvent solutions, oil-in-water or water-in-oil emulsions, or aqueous dispersion.

Complete kills of northern fat headed minnow are obtained when the fishes environment contain 2-[6-(2-propynyloxy)-m-tolyl] - 2H - benzotriazole at concentrations of one part per million by weight.

I claim:
2-[6-(2-propynyloxy)-m-tolyl]-2H-benzotriazole.

No references cited.

NICHOLAS S. RIZZO, *Primary Examiner.*